United States Patent
Ohta et al.

(10) Patent No.: US 8,405,912 B2
(45) Date of Patent: Mar. 26, 2013

(54) HEADUP DISPLAY DEVICE AND METHOD FOR CONTROLLING THE SAME

(75) Inventors: Kazuhide Ohta, Nagoya (JP); Tatsuya Sasaki, Chiryu (JP)

(73) Assignee: Denso Corporation, Kariya (JP)

( * ) Notice: Subject to any disclaimer, the term of this patent is extended or adjusted under 35 U.S.C. 154(b) by 363 days.

(21) Appl. No.: 12/928,020

(22) Filed: Dec. 1, 2010

(65) Prior Publication Data

US 2011/0134498 A1    Jun. 9, 2011

(30) Foreign Application Priority Data

Dec. 8, 2009    (JP) .................................. 2009-278828

(51) Int. Cl.
*G02B 27/14* (2006.01)
(52) U.S. Cl. ........................................................ 359/633
(58) Field of Classification Search ............... 359/197.1, 359/200.7, 212.1, 223.1, 629–633, 877; 396/66
See application file for complete search history.

(56) References Cited

U.S. PATENT DOCUMENTS

| | | | | |
|---|---|---|---|---|
| 7,333,269 | B2 * | 2/2008 | Shiobara et al. | 359/630 |
| 2005/0259301 | A1 * | 11/2005 | Aoki et al. | 345/633 |
| 2008/0212196 | A1 * | 9/2008 | Watanabe et al. | 359/632 |
| 2011/0242666 | A1 * | 10/2011 | Sasaki et al. | 359/630 |
| 2011/0242669 | A1 * | 10/2011 | Torii | 359/633 |

FOREIGN PATENT DOCUMENTS

| | | |
|---|---|---|
| JP | 03-139197 | 6/1991 |
| JP | A-H9-49979 | 2/1997 |
| JP | 2001-91302 | 4/2001 |
| JP | 2009-098501 | 5/2009 |
| JP | 2009-149230 | 7/2009 |
| JP | 2009-196473 | 9/2009 |
| JP | 2009-265247 | 11/2009 |
| KR | 1019980051777 | 9/1998 |
| KR | 1020100033770 | 3/2010 |
| KR | 1020100073414 | 7/2010 |

OTHER PUBLICATIONS

Notice of Allowance dated Sep. 26, 2012 in corresponding Korean Application No. 10-2010-0123900 (English translation not provided).
Office action dated Nov. 1, 2011 in Japanese Application No. 2009-278828.

* cited by examiner

*Primary Examiner* — Derek S Chapel
*Assistant Examiner* — Jeffrey Madonna
(74) *Attorney, Agent, or Firm* — Harness, Dickey & Pierce, P.L.C.

(57) ABSTRACT

A reflection unit reflects an image indicated on an indicator and projects the image on a combiner to indicate a virtual image of the image at a position viewable for a user. A stepping motor rotates the reflection unit to move the virtual image continuously in a predetermined section of the combiner. A control unit controls a driving power of the stepping motor such that a smoothness parameter becomes less than a predetermined value. The smoothness parameter is defined by a division of a difference between the maximum speed of the virtual image and an average speed of the virtual image, when the virtual image moves continuously in the predetermined section, by the average speed.

10 Claims, 6 Drawing Sheets

| INDICATION SPEED | | | 10V | | 10.5V | | 10.7V | | 10.8V | | 10.9V | | 11V | | 11.5V | | 13V | | 15V | |
|---|---|---|---|---|---|---|---|---|---|---|---|---|---|---|---|---|---|---|---|---|
| | VOLTAGE | | | | | | | | | | | | | | | | | | | |
| | MOVING DIRECTION | | DOWN | UP | DOWN | UP | DOWN | UP | DOWN | UP | DOWN | UP | DOWN | UP | DOWN | UP | DOWN | UP | DOWN | UP |
| MOTOR A (50mm/s) | VIEWABILITY EVALUATION | | | | | | | | | | | | | | | ○ | | | | |
| | SPEED FLUCTUATION RANGE [mm/ms] | | | | | | | | | | | | | | 0.078 | 0.037 | | | | |
| | SMOOTHNESS PARAMETER [%] | | | | | | | | | | | | | | 73 | 33 | | | | |
| MOTOR B (42mm/s) | VIEWABILITY EVALUATION | | × | | | | | | | | | | | | | | | | | |
| | SPEED FLUCTUATION RANGE [mm/ms] | | | | | | | | | | | | | | 0.0592 | 0.0571 | | | | |
| | SMOOTHNESS PARAMETER [%] | | | | | | | | | | | | | | 89 | 85 | | | | |
| MOTOR B (50mm/s) | VIEWABILITY EVALUATION | | | | | △ | | △ | | △ | | △ | | ○ | | △ | | | | △ |
| | SPEED FLUCTUATION RANGE [mm/ms] | | 0.0687 | 0.0731 | | | | | | | | | | | 0.067 | 0.069 | | | 0.0692 | 0.0675 |
| | SMOOTHNESS PARAMETER [%] | | 81 | 90 | | | | | | | | | | | 80 | 83 | | | 82 | 81 |
| MOTOR B (63mm/s) | VIEWABILITY EVALUATION | | △ | | | △ | | △ | | ○ | | ○ | | ○ | | ○ | | ○ | | ○ |
| | SPEED FLUCTUATION RANGE [mm/ms] | | 0.0845 | 0.0907 | 0.0831 | 0.085 | 0.0809 | 0.083 | 0.084 | 0.083 | 0.082 | 0.082 | 0.083 | 0.084 | 0.0746 | 0.0735 | 0.0822 | 0.0805 | 0.0796 | 0.0797 |
| | SMOOTHNESS PARAMETER [%] | | 75 | 87 | 78 | 80 | 71 | 76 | 75 | 77 | 74 | 77 | 74 | 73 | 65 | 70 | 72 | 73 | 70 | 73 |
| MOTOR B (71mm/s) | VIEWABILITY EVALUATION | | △ | | | △ | | △ | | ○ | | ○ | | ○ | | ○ | | ○ | | ○ |
| | SPEED FLUCTUATION RANGE [mm/ms] | | 0.0922 | 0.1 | 0.0865 | 0.096 | 0.089 | 0.091 | 0.089 | 0.088 | 0.089 | 0.092 | 0.0857 | 0.0882 | 0.0849 | 0.092 | 0.0868 | 0.0873 | 0.0857 | 0.0881 |
| | SMOOTHNESS PARAMETER [%] | | 75 | 88 | 67 | 80 | 69 | 75 | 70 | 72 | 67 | 72 | 64 | 73 | 64 | 72 | 67 | 71 | 64 | 71 |

HEADUP DISPLAY DEVICE AND METHOD FOR CONTROLLING THE SAME

CROSS REFERENCE TO RELATED APPLICATIONS

This application is based on and incorporates herein by reference Japanese Patent Application No. 2009-278828 filed on Dec. 8, 2009.

FIELD OF THE INVENTION

The present invention relates to a headup display device. The present invention further relates to a method for controlling the headup display device. The headup display device may be applicable to a vehicular display device.

BACKGROUND OF THE INVENTION

For example, JP-A-2009=196473 discloses one example of a conventional vehicular headup display device (HUD device). The vehicular HUD device is configured to modify a display position of a virtual image indicating information, according to a position of a driver's eyes. The vehicular HUD device includes an indicator and a combiner. The indicator includes a liquid crystal display device, a first reflector, a second reflector, and the like. The indicator is accommodated in a case and located in an instrument panel. The combiner is, for example, a half mirror layer having reflectivity and transmissivity to light. The combiner is formed in an inner surface of a windshield. The liquid-crystal-display device indicates an information image exhibiting information such as a traveling speed. The first reflector reflects light of the information image to the second reflector. The second reflector is a rotatable concave mirror configured to reflect the light reflected by the first reflector to the combiner. In this way, the information image is indicated as a virtual image at a predetermined display position: The second reflector is fixed to a shaft. The shaft is fixed to a bearing at one end to be rotatable. The shaft is fixed to a motor, such as a stepping motor, at the other end. The motor is configured to rotate the shaft in a clockwise direction or a counterclockwise direction by an angle, corresponding to an electric signal received from an external device such as a control device. In this way, the motor rotates the second reflector, thereby to modify the display position of the virtual image. As described above, the HUD device may employ a stepping motor as a motor to modify the display position of the virtual image. In this case, when the display position of the indicated virtual image is modified, movement of the virtual image may not be viewed smoothly. That is, movement of the virtual image may be viewed stepwise. Accordingly, an HUD device is required to enable movement of an indicated virtual image to be viewed smoothly when the display position of the indicated virtual image is modified.

SUMMARY OF THE INVENTION

In view of the foregoing and other problems, it is an object of the present invention to produce a headup display device configured to enhance smoothness of a virtual image moving continuously in a predetermined section when a display position of the virtual image is modified. It is another object of the present invention to produce a method for determining a driving property of a stepping motor of the headup display device.

According to one aspect of the present invention, a headup display device comprises an indicator configured to indicate an image. The headup display device further comprises a reflection unit configured to reflect the image indicated on the indicator and project the image on a combiner to indicate a virtual image of the image at a position viewable for a user. The headup display device further comprises a stepping motor configured to rotate the reflection unit to move the virtual image continuously in a predetermined section of the combiner. The headup display device further comprises a drive control unit configured to control the stepping motor. The drive control unit is configured to control a driving power of the stepping motor such that a smoothness parameter becomes less than a predetermined value. The smoothness parameter is defined by a fraction including a numerator and a denominator. The numerator is a difference between a maximum speed of the virtual image when the virtual image moves continuously in the predetermined section and an average speed of the virtual image when the virtual image moves continuously in the predetermined section. The denominator is the average speed.

According to another aspect of the present invention, a method for controlling a headup display device, the headup display device including an indicator configured to indicate an image, a reflection unit configured to reflect the image indicated on the indicator and project the image on a combiner to indicate a virtual image, and a stepping motor configured to rotate the reflection unit to move the virtual image continuously in a predetermined section of the combiner, the method comprises calculating a smoothness parameter defined by a fraction including a numerator and a denominator, wherein the numerator is a difference between a maximum speed of the virtual image when the virtual image moves continuously in the predetermined section and an average speed of the virtual image when the virtual image moves continuously in the predetermined section, wherein the denominator is the average speed. The method further comprises determining a driving property of the stepping motor such that the smoothness parameter becomes less than a predetermined value.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

As follows, an embodiment of the present invention will be described with reference to drawings. The same or equivalent elements in the drawings are denoted by the same reference numeral. In the present embodiment, a headup display device (HUD device) is applied to an HUD device 100 for a vehicle.

The vehicular HUD device 100 is configured to indicate information at a position to enable a driver being in a driving state to recognize the information substantially without moving a visual axis. The vehicular HUD device 100 may indicate, for example, an image, which exhibits instruction of a traveling direction calculated by a navigation device, an image, which exhibits traveling speed information on the vehicle in a predetermined indication color, and/or an image, which exhibits vehicle information such as remaining fuel information and cooling water temperature information on a vehicle. In the present embodiment, an image exhibiting instruction of the traveling direction will be described as one example.

Figure 1:
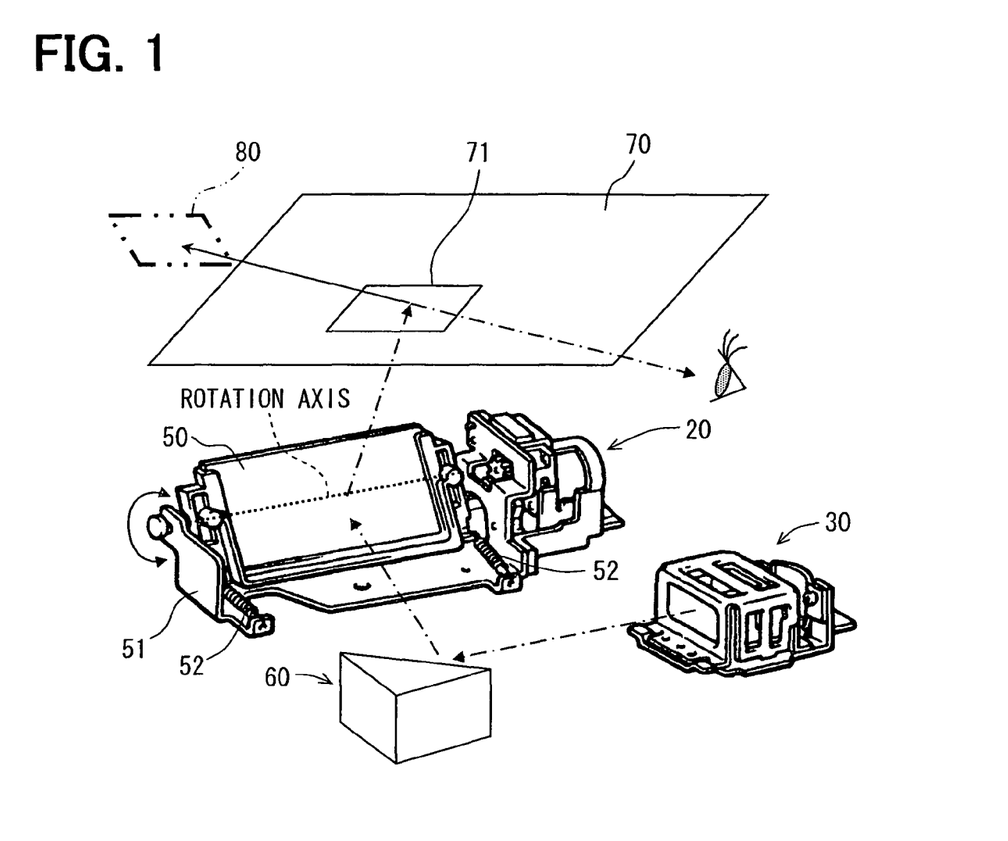
FIG. 1 is an overview showing an HUD device according to an embodiment of the present invention.
Figure 2:
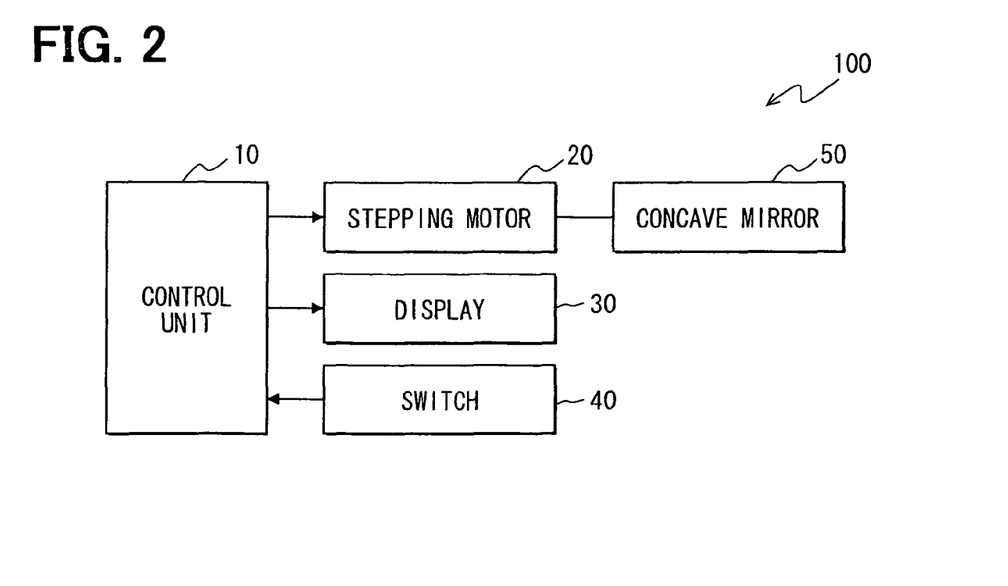
FIG. 2 is a block diagram showing the HUD device according to the embodiment of the present invention.

As shown in FIGS. 1, 2, the vehicular HUD device 100 includes a display unit including a combiner 71, a control unit 10, a stepping motor 20, an indicator 30, a switch device 40, a concave mirror (reflection unit) 50, a reflector 60, and the like. The combiner 71 is formed on the inner surface of a windshield 70 on the side of the vehicle interior to be opposed to a driver seat.

The control unit 10, the stepping motor 20, the indicator 30, the concave mirror 50 (reflection unit), the reflector 60, and the like of the display unit are accommodated in and fixed to a case and located inside of, for example, an instrument panel. The concave mirror 50 is configured to reflect light to project the reflected light to the combiner 71 of the windshield 70.

The control unit 10 is configured of a microcomputer including a CPU, a storage unit such as a RAM, a ROM, an EEPROM, and the like. As shown in FIG. 2, the control unit 10 is electrically connected with the stepping motor 20, the indicator 30, the switch device 40, and the like. The control unit 10 (drive control unit) controls operation of the stepping motor 20 according to a signal outputted from the switch device 40 in line with a driving property (driver form, driver voltage, driving speed). The driving property is determined according to a smoothness parameter to be described later. Data on the driving property is stored in an EEPROM or the like. The control unit 10 outputs a display control signal to the indicator 30 thereby to perform display control of the indicator 30.

The control unit 10 outputs a signal according to a signal from the switch device 40 (described later) thereby to control the stepping motor 20. Specifically, the stepping motor 20 rotates in the normal direction or the reverse direction by an angle corresponding to the signal from the control unit 10. The stepping motor 20 has an output shaft equipped with a motor side gear (not shown) engaged with a mirror side gear (not shown) equipped to a rotation axis of the concave mirror 50. The stepping motor 20 and the concave mirror 50 are located at a position in which the motor side gear and the mirror side gear can be engaging with each other.

The indicator 30 includes a display panel, a light source, and the like. The control unit 10 controls indication of the indicator 30. The indicator 30 is arranged such that a screen of the display panel of the indicator 30 is directed toward the reflector 60. The display panel is, for example, a dot-matrix type TFT transmissive LCD monitor having the screen configured of multiple liquid crystal pixels arranged in a two dimensional plane. The display panel activates the pixels to indicate an image on the screen. The light source is configured of, for example, a light emitting diodes and/or the like. The light source is located behind the display panel to be on the opposite side of the reflector 60 and configured to emit light to the display panel.

The reflector 60 and the concave mirror 50 project an image, which is indicated on the display panel of the indicator 30 and illuminated by the light source therethrough to be an optical image, toward the combiner 71 on the windshield 70 of the vehicle. The projected image is formed in front of the windshield 70 and indicated as a virtual image on the side of the driver seat in the vehicle. Thus, an occupant seated on the driver seat can visually recognize an image (virtual image) 80 indicated at a focus position on the front side. The combiner 71 is formed as, for example, a half mirror layer having reflectivity and transmissivity to light.

The switch device 40 is for controlling the display position of the image (virtual image) 80. The switch device 40 outputs a signal to the control unit 10 according to operation of a user. Specifically, for example, the position of driver's eyes may change when the driver's sitting height changes due to take over of a driver, when the driver's seat position changes in the back to front direction, and/or when the angle of inclination of the backrest of the driver seat changes. Accordingly, the display position of the image (virtual image) 80 may not be suitable for a driver. In such a case, a driver may manipulate the switch device 40 to adjust the display position of the image (virtual image) 80 at a desirable position.

The switch device 40 may include, for example, two switches including an up switch and a down switch. More specifically, for example, the switch device 40 may be configured to output different signals correspondingly to a single push on the up switch, a long push on the up switch, a single push on the down switch, and a long push on the down switch. The single push may be made by depressing a switch by once within a specified time period. The long push may be made by depressing a switch for a specified time period or longer.

Referring to FIG. 1, the concave mirror 50 is supported by a holding member 51 to be rotatable. A spring member 52 is located between the holding member 51 and the concave mirror 50 for absorbing oscillation and sound caused by backlash (gap) between the motor side gear and the mirror side gear. The concave mirror 50 has a rotation axis supported by the holding member 51 at one end to be rotatable. The rotation axis of the concave mirror 50 is equipped with the mirror side gear at the other end, and the mirror side gear is engaged with the motor side gear. The concave mirror 50 is located at a position in which the mirror surface of the concave mirror 50 can reflect the light to project the image indicated on the indicator 30 toward the combiner 71 of the windshield 70.

Figure 3:
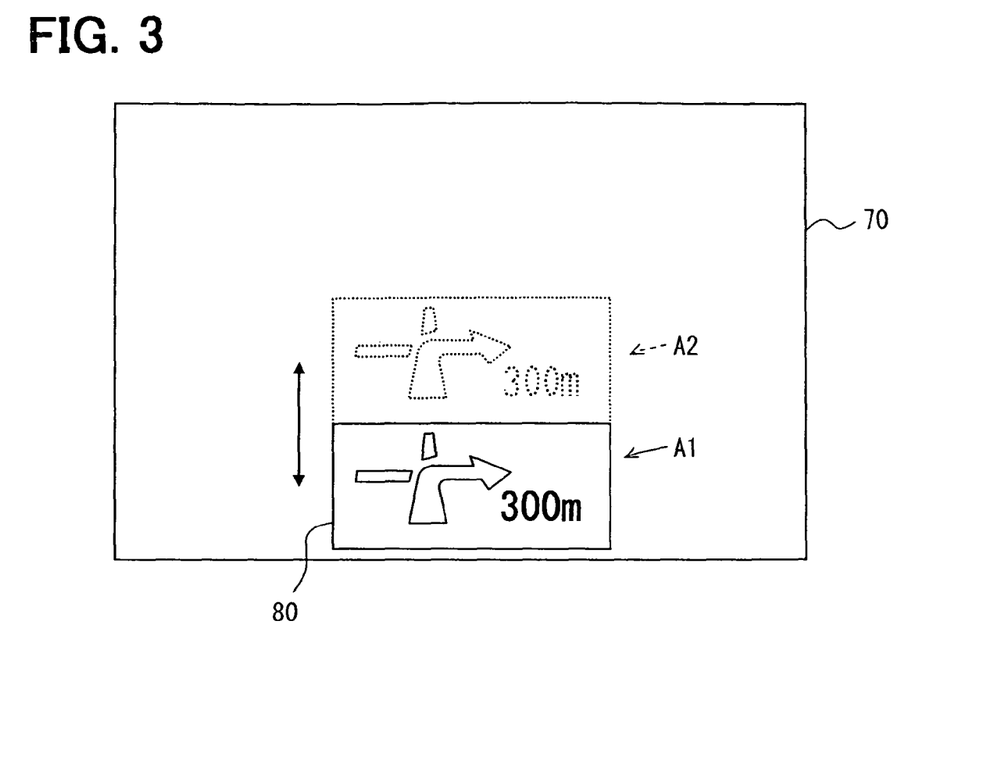
FIG. 3 is a schematic view showing one example of indication of an image of the HUD device.

The concave mirror 50 rotates around the rotation axis with normal rotation and reverse rotation of the stepping motor 20. In this way, the stepping motor 20 rotates the concave mirror 50 to move the image (virtual image) 80 in a predetermined section, thereby modifying the display position of the image (virtual image) 80. In the present embodiment, as shown in FIG. 3, the display position of the image (virtual image) 80 can be modified in a section between a display position A1 and a display positions A2. The display position A1 is a lower limit position in a movable range, and the display positions A2 is an upper limit position of the movable range.

Figure 4:
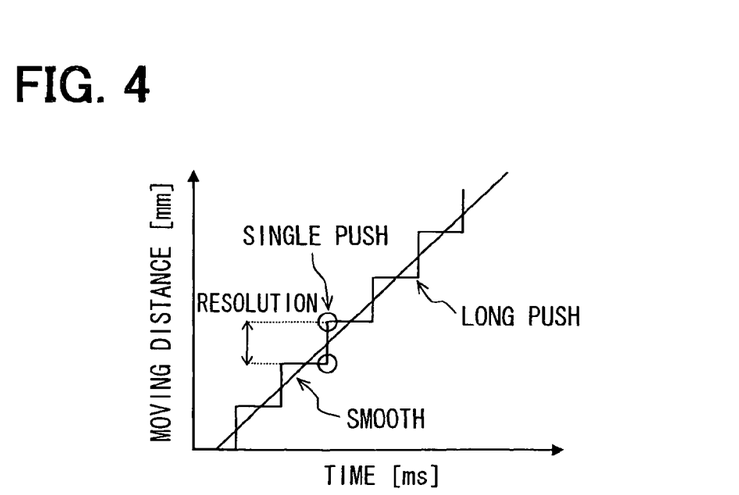
FIG. 4 is a graph showing a relationship between a moving distance of a virtual image and a time.

The control unit 10 rotates the stepping motor 20 in the normal direction or the reverse direction by a rotation angle determined beforehand in response to a single push of the up switch or the down switch of the switch device 40. The concave mirror 50 rotates in the normal direction or the reverse direction with rotation of the stepping motor 20. In this way, the image (virtual image) 80 moves by a predetermined distance in the movable range between the display position A1 and the display position A2 in response to a single depression of the up switch or the down switch. Thus, as shown in FIG. 4, the display position is modified.

The rotation angle of the stepping motor 20 in response to a single push of the up switch or the down switch is predetermined according to the distance by which the display position of the image (virtual image) 80 moves when a single push is made on the up switch or the down switch. That is, the rotation angle of the stepping motor 20 is predetermined according to the number of steps into which the movable range of the display position of the image (virtual image) 80 between the display position A1 and the display positions A2 is divided.

Alternatively, in response to long push of the up switch or the down switch of the switch device 40, the control unit 10 rotates the stepping motor 20 in the normal direction or the reverse direction while the up switch or the down switch is depressed. The concave mirror 50 rotates in the normal direction or the reverse direction with rotation of the stepping motor 20. In this way, the image (virtual image) 80 continually moves in the movable range between the display position A1 and the display position. A2 in a time period in which the up switch or the down switch is depressed. Thus, as shown in FIG. 4, the display position is modified.

Figure 5:
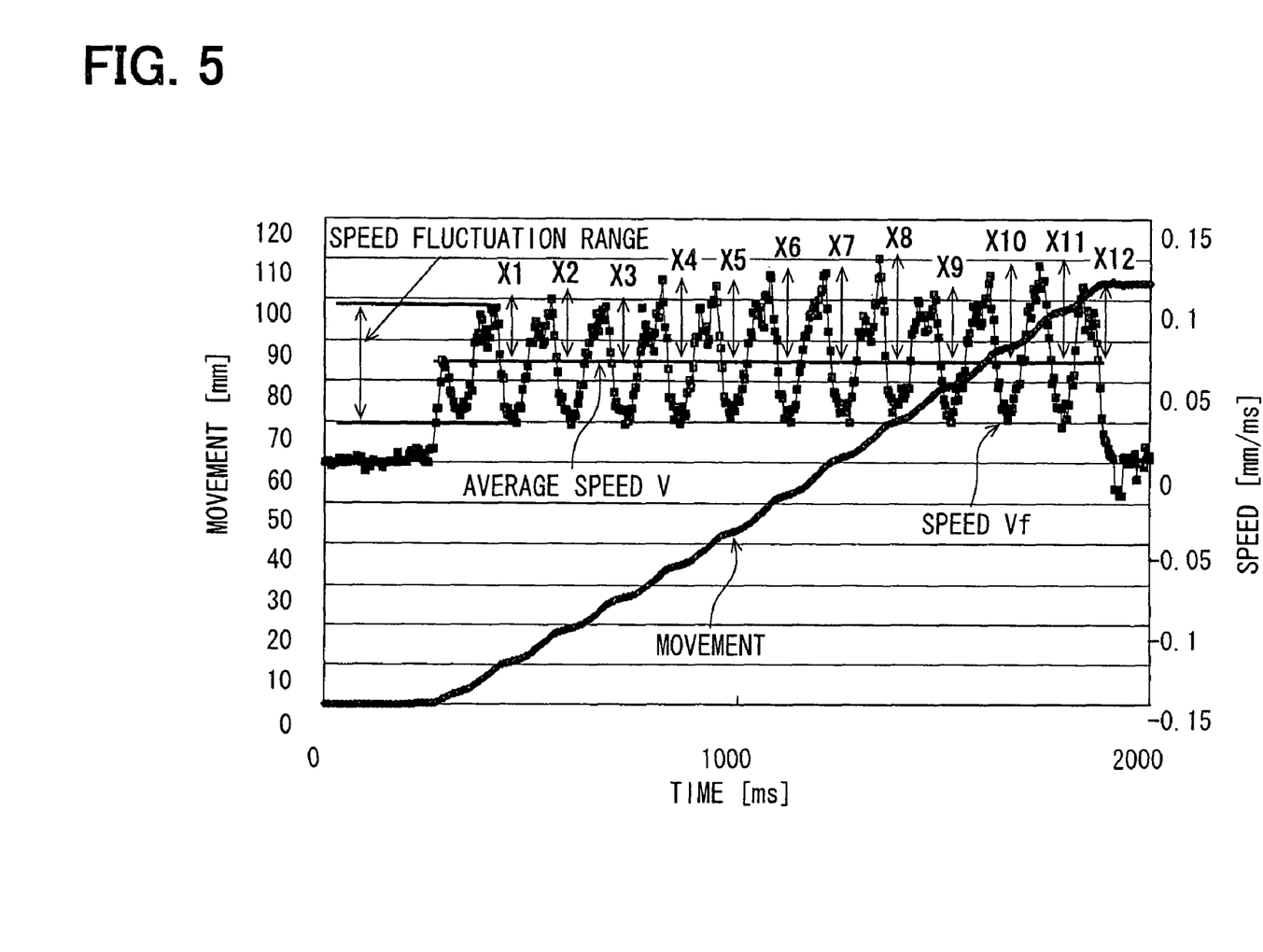
FIG. 5 is a graph showing a relationship between a movement of a virtual image and a time and a relationship between a moving speed of a virtual image and a time.

The vehicular HUD device 100 is required to have a configuration to move the image (virtual image) 80 smoothly when continually moving the image (virtual image) 80 to modify the display position. FIG. 5, is a graph showing a relation between movement [mm] of the image (virtual image) 80 and a time [ms] and a relation between moving speed [mm/ms] of the image (virtual image) 80 and a time [ms] when the stepping motor 20 is rotated to move the image (virtual image) 80 continuously from the display position A1 to the display position A2.

The vehicular HUD device 100 includes the stepping motor 20 as a motor to modify the display position of the image (virtual image) 80. Therefore, as shown in FIG. 5, when the image (virtual image) 80 is continuously moved from the display position A1 to the display position A2 while the image (virtual image) 80 is indicated, the moving speed of the image (virtual image) 80 periodically varies due to speed fluctuation. Accordingly, the image (virtual image) 80 may be viewed to be moving non-smoothly when the display position of the image (virtual image) 80 is modified. That is, the virtual image may be viewed to be moving stepwise. The speed fluctuation range in FIG. 5 is a variable range (fluctuation range) when the moving speed of the image (virtual image) 80 varies.

In general, there is no definition about smoothness of operation of an HUD device. The moving speed such as average speed and maximum speed of the image (virtual image) 80 can be calculated by a parameter calculation device 200 (described later) or the like. FIG. 5 is a graph showing the relation between movement of the image (virtual image) 80 and time and the relation between moving speed of the image (virtual image) 80 and time when the image (virtual image) 80 is continuously moved from the display position A1 to the display position A2 while the image (virtual image) 80 is indicated. It is noted that the relation between movement of the image (virtual image) 80 and time and the relation between moving speed of the image (virtual image) 80 and time when the image (virtual image) 80 is continuously moved from the display position A2 to the display position A1 while the image (virtual image) 80 is indicated are substantially the same as those in FIG. 5.

The present inventors conducted research in order to satisfy the above requirement and consequently investigated a fact that movement of the image (virtual image) 80 becomes smooth when a smoothness parameter A defined by the following equation (1) becomes small. In view of the investigated fact, the following equation (1) is determined to define the smoothness of continuous movement of the image (virtual image) 80 between the display position A1 and the display position A2 in the state where the image (virtual image) 80 is indicated while long push is made on the up switch or the down switch of the switch device 40 of the vehicular HUD device 100. Further, a driving property such as a driving form, a driving voltage, and a driving speed of the stepping motor is determined such that the smoothness parameter A calculated by using the equation (1) becomes less than a predetermined value. Thus, a method for determining a driving property of a stepping motor is produced. Further, the vehicular HUD device 100 is configured to drive the stepping motor 20 to move the image (virtual image) 80 continuously between the display position A1 and the display position A2 while indicating the image (virtual image) 80, such that the smoothness parameter A calculated by the equation (1) becomes less than the predetermined value. The smoothness parameter A when the stepping motor 20 is driven by the determined driving property may be used as a specification value of the vehicular HUD device 100.

$$\frac{\sum_{k=1}^{N} \text{abs}(Xk)}{N} \times \frac{1}{\text{abs}(V)} \times 100 \ [\%] \tag{1}$$

In the equation (1), X is a difference between a maximum (movement) speed Vmax of the image (virtual image) 80 at each cycle caused by speed fluctuation when the image (virtual image) 80 is moved continuously in a predetermined section and an average (movement) speed (speed average value) V of the image (virtual image) 80 when the image (virtual image) 80 is moved continuously in the predetermined section. In this case, the predetermined section is between the display position A1 and the display positions A2. That is, the numerator is an average value of the difference between the maximum (movement) speed Vmax of the image (virtual image) 80 at each cycle caused by speed fluctuation when the image (virtual image) 80 moves continuously in the predetermined section and the average (movement) speed (speed average value) V of the image (virtual image) 80 when the image (virtual image) 80 moves continuously in the predetermined section. N is the number of cycles of speed change when the image (virtual image) 80 s moved continuously in the predetermined section between the display position A1 and the display positions A2. In FIG. 5, the cycle N is 12, and X is between X1 and X12.

In the equation (1), the arithmetical average of the difference between the maximum (movement) speed Vmax of the image (virtual image) 80 at each cycle caused by speed fluctuation, when the image (virtual image) 80 is moved continuously in the predetermined section between the display position A1 and the display positions A2, and the average (movement) speed (speed average value) V of the image (virtual image) 80, when the image (virtual image) 80 is moved continuously in the predetermined section between display position A1 and the display positions A2, is employed. Alternatively, the difference between the maximum (movement) speed Vmax of the image (virtual image) 80, when the image (virtual image) 80 is moved continuously in the predetermined section, and the average (movement) speed (speed average value, average speed) V of the image (virtual image) 80, when the image (virtual image) 80 is moved continuously in the predetermined section between the display position A1 and the display positions A2, may be employed.

Figure 6:
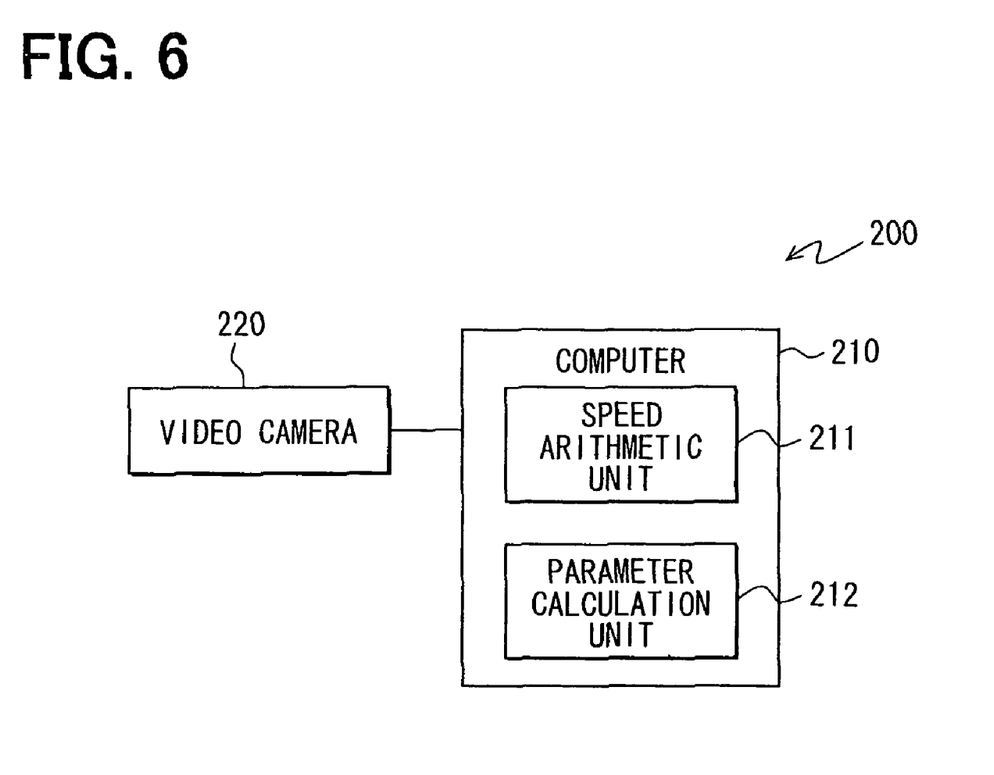
FIG. 6 is a block diagram showing a parameter calculation device according to the embodiment of the present invention.

FIG. 6 shows one example of the parameter calculation device 200 for calculating the smoothness parameter A. The parameter calculation device 200 includes a computer 210 and a video camera 220. The computer 210 includes a CPU and a storage unit such as a RAM, a ROM, an EEPROM, and the like for executing a processing. The video camera 220 is connected to the computer 210 and located at a position, such as a driver seat, in which the video camera 220 can photograph the image (virtual image) 80. The computer 210 includes a speed arithmetic unit 211 and a parameter calculation unit 212. The speed arithmetic unit 211 calculates the speed, such as the average speed and the maximum speed, at which the image (virtual image) 80 moves. The parameter calculation unit 212 calculates the smoothness parameter A according to a calculation result of the speed arithmetic unit 211. The smoothness parameter A, when the image (virtual image) 80 moves from the display position A1 to the display position A2 (upward), and the smoothness parameter A, when the image (virtual image) 80 moves from the display position A2 to the display position A1 (downward), are calculated.

As follows, a calculating method of the smoothness parameter using the parameter calculation device 200 will be described. The smoothness parameter is calculated from one of the smoothness parameter A (upward) and the smoothness parameter A (downward). Whichever of the smoothness parameter A (upward) and the smoothness parameter A (downward) may be calculated first.

For calculating the smoothness parameter A (upward), the image (virtual image) 80 is first moved from the display position A1 to the display position A2 by performing long push on the up switch of the vehicular HUD device 100. While the image (virtual image) 80 is moved from the display position A1 to the display position A2 in this way, the video camera 220 of the parameter calculation device 200 photographs movement of the image (virtual image) 80 at capture intervals such as 4 ms. Subsequently, the speed arithmetic unit 211 calculates the speed, such as the average speed and the maximum speed, at which the image (virtual image) 80 moves, from a photograph signal of the image (virtual image) 80 outputted from the video camera 220. The parameter calculation unit 212 calculates the smoothness parameter A (upward) based on a calculation result of the speed arithmetic unit 211 and the equation.

For calculating the smoothness parameter A (downward), the image (virtual image) 80 is first moved from the display position A2 to the display position A1 by performing long push on the down switch of the vehicular HUD device 100. Subsequently, the video camera 220 photographs movement of the image (virtual image) 80 at capture intervals such as 4 ms, and the speed arithmetic unit 211 calculates speed, such as the average speed and the maximum speed, at which the image (virtual image) 80 moves, similarly to the calculation of the smoothness parameter A (upward). Thus, the parameter calculation unit 212 calculates the smoothness parameter A (downward) based on a calculation result of the speed arithmetic unit 211 and the equation.

Subsequently, a driving property of the stepping motor 20, such as a driving form, a driving voltage, and a driving speed, is switched to various states and values to determine a driving property, such as a driving form, a driving voltage, and a driving speed, by which the smoothness parameter A becomes less than the predetermined value. The driving form may employ a two-phase magnetization form, a micro step form, and the like. When a micro step form is employed as the driving form, the number of steps and the like may be further determined. Data on the driving property is stored in an EEPROM or the like. At least one of a driving form, such as the number of steps, a driving voltage, and a driving speed may be switched, i.e. changed to switch the driving property such that the smoothness parameter A becomes less than the predetermined value.

Figure 7:
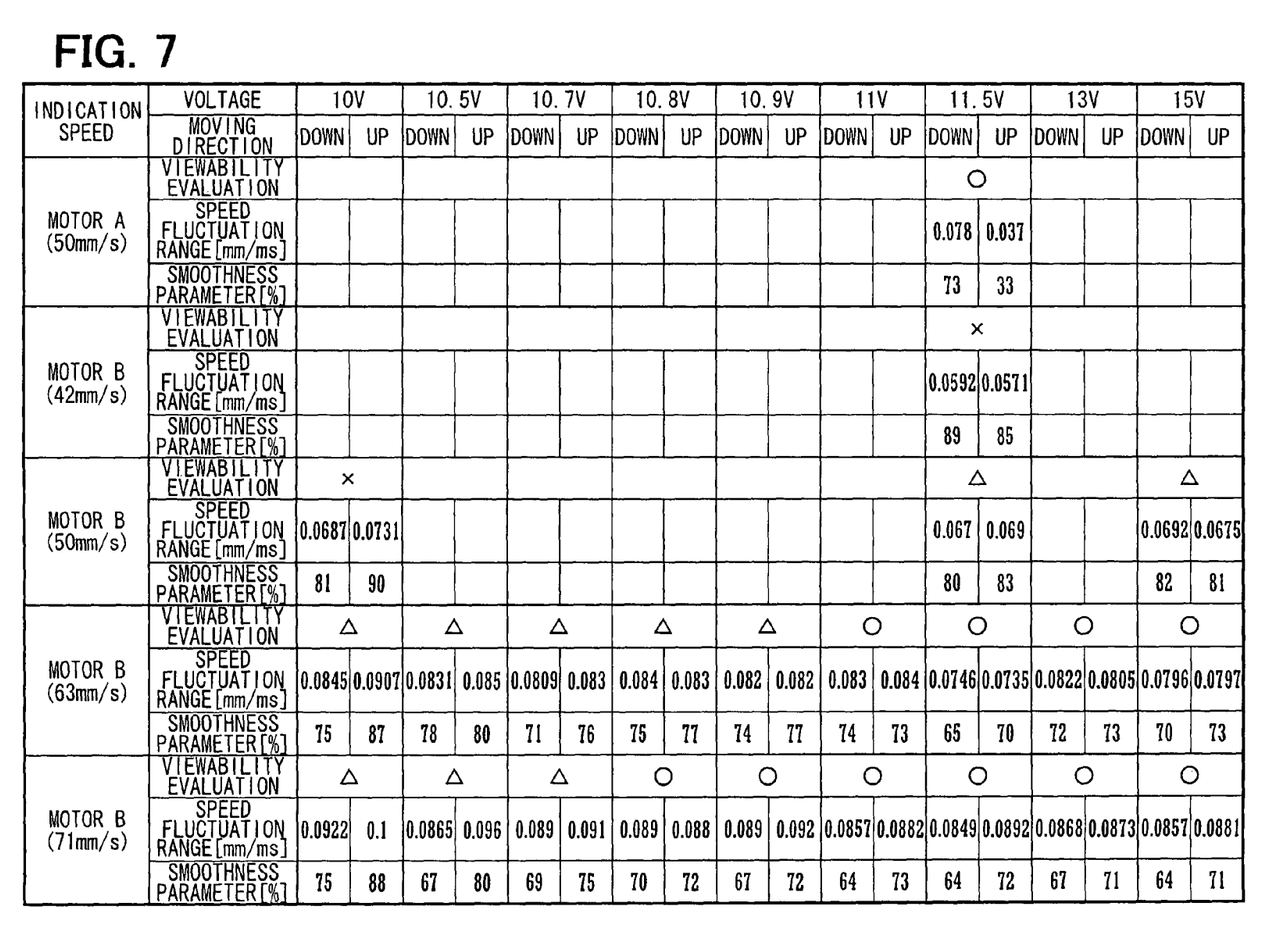
FIG. 7 is a view showing an evaluation result of smoothness.

FIG. 7 shows an evaluation result of smoothness when a stepping motor B is used as a motor. The smoothness evaluation is made by driving a stepping motor in various kinds of driving forms to move the image (virtual image) 80 in the direction from the indication region A1 to the indication region A2 and in the direction from the indication region A2 to the indication region A1. Thus, smoothness of viewability of the image (virtual image) 80 for a person is evaluated at three levels (○, Δ, x). In other words, the smoothness evaluation is also a viewability evaluation. In FIG. 7, the moving direction of the indicated image (virtual image) 80 is denoted by UP when moving upward from the indication region A1 to the indication region A2 and denoted by DOWN when moving downward from the indication region A2 to the indication region A1.

Figure 8:
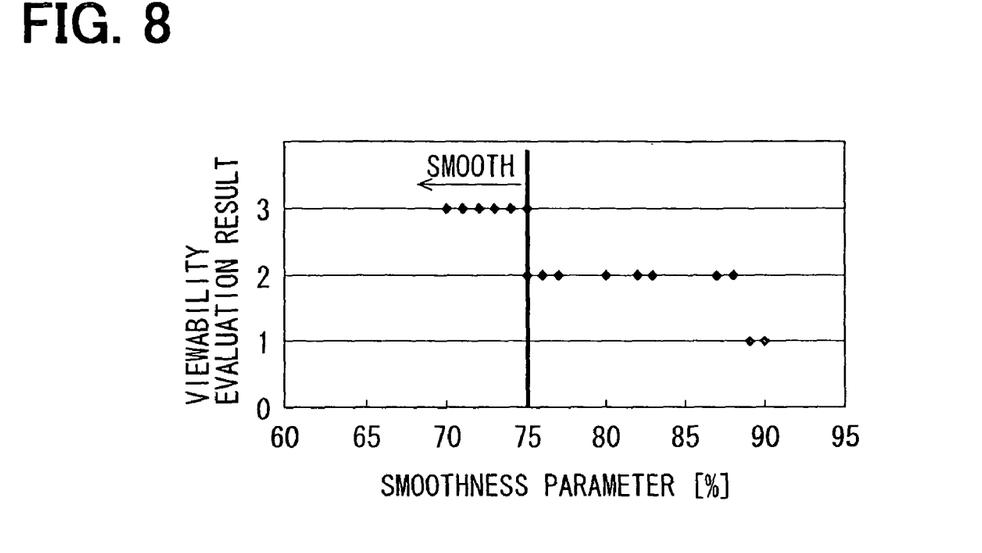
FIG. 8 is a graph showing a relation between a smoothness parameter and the evaluation result.
Figure 9:
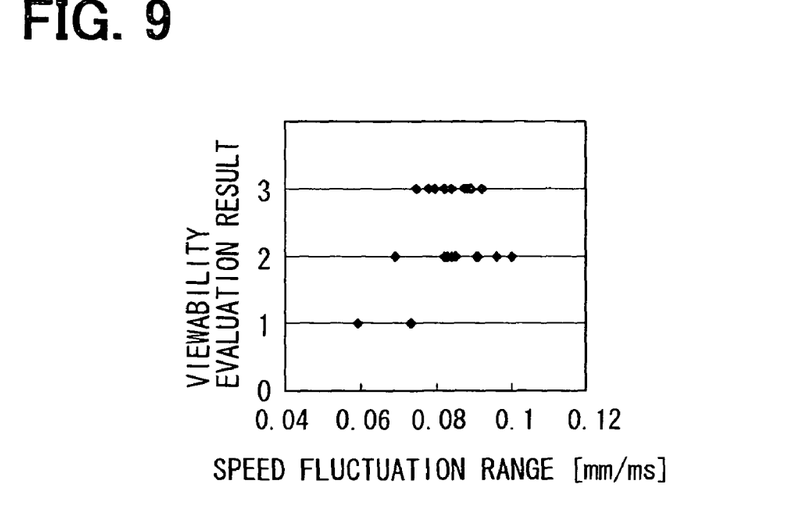
FIG. 9 is a graph showing a relation between a speed fluctuation range of a virtual image and the evaluation result.

FIG. 8 is a graph showing a relation between the smoothness parameter A and a viewability evaluation result obtained from the viewability evaluation result shown in FIG. 7. FIG. 9 is a graph showing a relation between the speed fluctuation range and a viewability evaluation result obtained from the viewability evaluation result shown in FIG. 7.

More specifically, FIG. 7 shows an evaluation result of the motor; B in an evaluation condition where the driving form is a micro step (five steps, five division), the driving frequency is 11 to 17 [pps], the driving voltage is switched between 10 to 15 [V] at nine levels, and the average indication moving speed (driving speed) is switched between 42 to 71 [mm/s] at four levels. FIG. 7 further includes an evaluation result (reference example) of a motor A, which is a currently used stepping motor, when being driven in a currently employed driving property. The motor A is driven in a condition where the driving form is two-phase magnetization, the driving voltage is 11.5 [V], the average indication moving speed is 50 [mm/s], and the driving frequency is 50 [pps].

As being obviously exhibited by the evaluation result of FIG. 7 and the graph of FIG. 8, the viewability evaluation changes in order of x, Δ, ○ (x to ○), as the smoothness parameter A becomes small. That is, movement of the image (virtual image) 80 can be rendered smooth when being viewed by eyes of a person.

As being obviously exhibited by the graph of FIG. 8, when the motor is driven such that the smoothness parameter A becomes greater than or equal to 75% and less than or equal to 88%, the viewability result becomes Δ (2). Therefore, the image (virtual image) 80 can be moved relatively smoothly. In other words, when the motor is driven such that the smoothness parameter A becomes greater than or equal to 75% and less than or equal to 88%, movement of the image (virtual image) 80 can be rendered relatively smooth when being viewed by eyes of a person. As being obviously exhibited by the graph of FIG. 8, when the motor is driven such that the smoothness parameter A becomes less than 75%, the viewability result becomes ○ (3). Therefore, the image (virtual image) 80 can be moved smoothly. In other words, when the motor is driven such that the smoothness parameter A becomes less than 75%, movement of the image (virtual image) 80 can be rendered smooth when being viewed by eyes of a person. Therefore, it may be further effective when the predetermined value is set to be less than 75%. On the other hand, as shown in FIG. 9, relevance between the speed fluctuation range and the smoothness (viewability evaluation result) may be low.

In this way, the control unit 10 (drive control unit) performs driving power control of the stepping motor 20 such that the smoothness parameter A defined by the equation becomes less than the predetermined value when long push is made on the up switch or the down switch of the vehicular HUD device 100 to continuously move the image (virtual image) 80. Thereby, smoothness of modification of the display position of the image (virtual image) 80 can be enhanced.

It may be further effective that the control unit 10 (drive control unit) controls the stepping motor 20 such that the smoothness parameter A becomes less than 75% by employing the predetermined value less than 75%. In this case, the image (virtual image) 80 can be moved further smoothly.

In addition, the smoothness (smoothness) is defined by the equation in this way. Therefore, smoothness of continuous movement of the display position of the image (virtual image) 80 in the vehicular HUD device 100 can be quantified. Thus, the smoothness can be specified in a specification sheet of the vehicular HUD device 100 and the like. Consequently, the smoothness of the vehicular HUD device 100 is also manageable as a specification value.

Summarizing the above embodiments, a headup display device is configured to project an image caused by a display unit on a combiner, thereby to indicate a virtual image of the image at a position, which a user can visually recognize. The display unit includes: an indicator configured to indicate an image; a reflection unit configured to reflect the image indicated on the indicator and project the image on the combiner; a stepping motor configured to rotate the reflection unit to move the virtual image continuously in a predetermined section of the combiner and modify a, display position of the virtual image; and a drive control unit configured to drive and control the stepping motor. The drive control unit is configured to perform a driving power control of the stepping motor such that a smoothness parameter becomes less than a predetermined value. The smoothness parameter is defined by a fraction of (a numerator/a denominator). That is, the smoothness parameter is calculated by dividing the numerator by the denominator. Specifically, the smoothness parameter is defined by (a difference between the maximum speed of the virtual image when the virtual image moves continuously in the predetermined section and an average speed of the virtual image when the virtual image moves continuously in the predetermined section)/(the average speed of the virtual image when the virtual image moves continuously in the predetermined section).

The present inventors conducted research and investigated that movement of the virtual image can be rendered smooth when the smoothness parameter defined by a division of (a difference between the maximum speed of the virtual image when the virtual image moves continuously in the predetermined section and an average speed of the virtual image when the virtual image moves continuously in the predetermined section) by (the average speed of the virtual image when the virtual image moves continuously in the predetermined section) becomes less than, the predetermined value. Therefore, driving of the stepping motor is controlled such that the smoothness parameter becomes less than the predetermined value, in this way. Thereby, it is possible to enhance smoothness of movement of the virtual image continuously in the predetermined section to modify the display position of the virtual image.

An average value of (the difference between the maximum speed of the virtual image when the virtual image moves continuously in the predetermined section and the average speed of the virtual image when the virtual image moves continuously in the predetermined section) at each cycle, when a speed at which the virtual image moves changes periodically and when the virtual image continuously moves in the predetermined section, may be substituted for the numerator of the smoothness parameter.

According to an evaluation result of the smoothness by changing a smoothness parameter, the present inventors investigated that movement of the virtual image moves can be rendered smooth without stepwise movement when the smoothness parameter is less than 75%. Therefore, it may be effective to set the predetermined value to 75%.

According to another aspect of the embodiment, a method for determining a driving method (driving property, driving form) of a stepping motor of a headup display device, the headup display device including an indicator configured to indicate an image, a reflection unit configured to reflect the image indicated on the indicator and project the image on a combiner, a stepping motor configured to rotate the reflection unit to move a virtual image continuously in a predetermined section of the combiner thereby to modify a display position of the virtual image, and a drive control unit configured to drive and control the stepping motor, the method includes: determining the driving property such that a smoothness parameter becomes less than a predetermined value. The smoothness parameter is defined by a fraction of (a numerator/a denominator). That is, the smoothness parameter is calculated by dividing the numerator by the denominator. Specifically, the smoothness parameter is defined by (a difference between the maximum speed of the virtual image when the virtual image moves continuously in the predetermined section and an average speed of the virtual image when the virtual image moves continuously in the predetermined section)/(the average speed of the virtual image when the virtual image moves continuously in the predetermined section).

The present inventors conducted research and investigated that movement of the virtual image can be rendered smooth when the smoothness parameter defined by a division of (a difference between the maximum speed of the virtual image when the virtual image moves continuously in the predetermined section and an average speed of the virtual image when the virtual image moves continuously in the predetermined section) by (the average speed of the virtual image when the virtual image moves continuously in the predetermined section) becomes less than the predetermined value. Therefore, the driving property is determined such that the smoothness parameter becomes less than the predetermined value, in this way. Thereby, it is possible to enhance smoothness of movement of the virtual image continuously in the predetermined section to modify the display position of the virtual image.

An average value of (the difference between the maximum speed of the virtual image when the virtual image moves continuously in the predetermined section and the average speed of the virtual image when the virtual image moves continuously in the predetermined section) at each cycle, when a speed at which the virtual image moves changes periodically and when the virtual image continuously moves in the predetermined section, may be substituted for the numerator of the smoothness parameter.

According to an evaluation result of the smoothness by changing a smoothness parameter, the present inventors investigated that movement of the virtual image moves can be rendered, smooth without stepwise movement when the smoothness parameter is less than 75%. Therefore, it may be effective to set the predetermined value to 75%.

A driving form of the stepping motor, a driving voltage, and a driving speed may be determined as the driving property.

The above processings such as calculations and determinations are not limited being executed by the control unit 10.

The control unit may have various structures including the control unit 10 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

As described above, the embodiments of the present invention have been mentioned. It is noted that the present invention is not limited to the above embodiments. Various modifications and alternations may be diversely made to the above embodiments without departing from the spirit of the present invention.

What is claimed is:

1. A headup display device comprising:
   an indicator configured to indicate an image;
   a reflection unit configured to reflect the image indicated on the indicator and project the image on a combiner to indicate a virtual image of the image at a position viewable for a user;
   a stepping motor configured to rotate the reflection unit to move the virtual image continuously in a predetermined section of the combiner; and
   a drive control unit configured to control the stepping motor, wherein
   the drive control unit is configured to control a driving power of the stepping motor such that a smoothness parameter becomes less than a predetermined value, and
   the smoothness parameter is defined by a fraction including a numerator and a denominator,
   wherein the numerator is a difference between a maximum speed of the virtual image when the virtual image moves continuously in the predetermined section and an average speed of the virtual image when the virtual image moves continuously in the predetermined section,
   wherein the denominator is the average speed.

2. The headup display device according to claim 1, wherein an average value of the difference at each cycle, when a speed at which the virtual image continuously moves in the predetermined section changes periodically at cycles, is substituted for the numerator of the smoothness parameter.

3. The headup display device according to claim 1, wherein the predetermined value is 75%.

4. A method for controlling a headup display device, the headup display device including an indicator configured to indicate an image, a reflection unit configured to reflect the image indicated on the indicator and project the image on a combiner to indicate a virtual image, and a stepping motor configured to rotate the reflection unit to move the virtual image continuously in a predetermined section of the combiner, the method comprising:
   calculating a smoothness parameter defined by a fraction including a numerator and a denominator, wherein the numerator is a difference between a maximum speed of the virtual image when the virtual image moves continuously in the predetermined section and an average speed of the virtual image when the virtual image moves continuously in the predetermined section, wherein the denominator is the average speed; and
   determining a driving property of the stepping motor such that the smoothness parameter becomes less than a predetermined value.

5. The method according to claim 4, wherein an average value of the difference at each cycle, when a speed at which the virtual image continuously moves in the predetermined section changes periodically at cycles, is substituted for the numerator of the smoothness parameter.

6. The method according to claim 4, wherein the predetermined value is 75%.

7. The method according to claim 4, further comprising:
   determining at least one of a driving form of the stepping motor, a driving voltage of the stepping motor, and a driving speed of the stepping motor, as the driving property.

8. The method according to claim 4, further comprising:
   controlling the stepping motor to rotate the reflection unit to move the virtual image, according to the determined driving property.

9. The method according to claim 8, further comprising:
   indicating the image on the indicator; and
   reflecting the image indicated on the indicator and received by the reflection unit and projecting the image on the combiner to indicate the virtual image.

10. A computer readable medium comprising instructions executed by a computer, the instructions including the method according to claim 4.

* * * * *